Dec. 3, 1929.                E. C. FOSTER                1,738,179
DIFFERENTIAL
Filed April 16, 1927
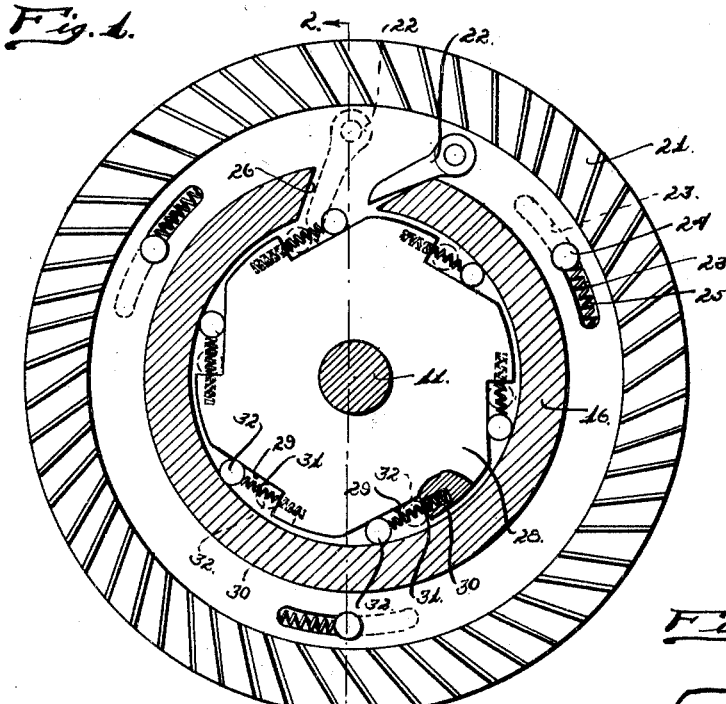
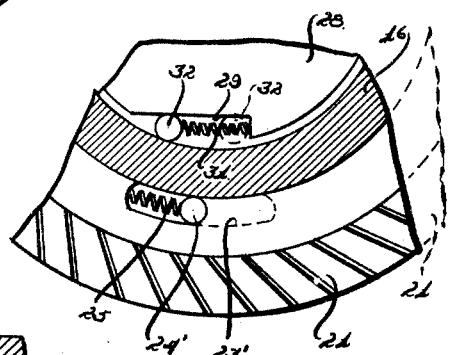
INVENTOR.
Ernest C. Foster.
BY
Thos. S. Donnelly
ATTORNEY.

Patented Dec. 3, 1929

1,738,179

UNITED STATES PATENT OFFICE

ERNEST C. FOSTER, OF INKSTER, MICHIGAN

DIFFERENTIAL

Application filed April 16, 1927. Serial No. 184,199.

My invention relates to a new and useful improvement in a differential adapted for use on automotive vehicles, and has for its object the provision of a differential which will be economic of manufacture, simple in structure, durable and highly efficient in use.

Another object of the invention is the provision of a differential which will be substantially noiseless.

Another object of the invention is the provision of a differential in which the backlash will be eliminated.

Another object of the invention is the provision of a differential in which the free coasting of the engine may be permitted, the various parts rotating when the engine is coasting being reduced to a minimum.

Another object of the invention is the provision of a differential in which the play between the various parts is practically eliminated.

Other objects will appear hereinafter.

The invention consists in the combination and arrangement of parts hereinafter described and claimed.

The invention will be best understood by a reference to the accompanying drawings which form a part of this specification, and in which Fig. 1 is a sectional view taken on substantially line 1—1 of Fig. 2.

Fig. 2 is a sectional view taken on substantially line 2—2 of Fig. 1.

Fig. 3 is a fragmentary view similar to Fig. 1 showing a modified form of the structure.

In the invention as illustrated in the drawings, I use with the invention a differential housing 7 having the closure plate 8 mounted thereon. Projected into the housing 7 is the drive shaft 9 carrying the pinion 10. Projecting outwardly from one side of the housing is the shaft 11. A roller bearing 12 is adapted to engage in the hub 13 of the housing, the neck 14 which projects outwardly from the disc plate 15 engaging the roller bearing 12 and serving as a bearing for the shaft 11. This plate or disc 15 is threaded or otherwise fixedly mounted upon the inner housing 16 having a neck 17, projecting therefrom and engaging a roller bearing 18 and serving as a bearing for the shaft 19, this roller bearing 18 being positioned in the hub 20 of the housing 7. Mounted upon the disc 15 is a ring gear 21 adapted to mesh with the pinion 10. Pivotally mounted upon the ring gear 21 is a dog 22. The ring gear is provided with the elongated arcuate slots 23 through which the bolts 24 which are threaded into the disc plate 16 engage, a spring 25 being positioned in the slot 23 at one side of the bolts 24 so as to engage at one end the bolts 24, and the other end the end of the slot 23 to normally retain the ring gear in a predetermined relation to the disc plate 15. Formed in the housing 16 is a slot 26 into which the dog 22 may project. Fixedly mounted upon the shaft 11 and spaced from the disc plate 15 by a suitable spacing washer 27, is a driving disc 28 having a plurality of notches 29 formed in its periphery, each of these notches having at its base a socket 30 in which engages one end of the spring 31, the other end engaging a roller 32 resting in the notch 29. A similar driving disc 33 is fixedly mounted upon the shaft 19 and spaced from the end of the housing 16 by the washer 34 and from the driving disc 28 by the spacing washer 35, the driving disc 33 being provided with the notches, rollers and springs as described for 28.

In operation, when the shaft 19 is set into rotation to drive the vehicle forwardly, the meshing of the pinion 10 with the ring gear 21 will effect a rotation of the housing 16. The springs 31 tend normally to force the rollers 32 outwardly away from the deeper portion of the recesses 29, and as the housing 16 is rotated, these rollers serve to effect a gripping between the housing 16 and the driving discs 28 and 33 so as to effect a rotating of the shafts 11 and 19. These shafts 11 and 19 are the shafts upon which the wheels of the vehicle are fixedly mounted.

In this way a differential is provided in which a positive gripping is effected so that both the shafts 11 and 19 will be driven regardless of the load placed upon either shaft. In this manner a spinning of one of the wheels, as is often made when one of the wheels is subjected to an excessive load, is prevented and the efficiency resulting from such an arrangement attained.

When it is desired that the vehicle coast, the motor being shut off, the shaft 9 will remain stationary, thus retaining the housing 16 in a stationary position relatively to the housing 8 and permitting the shafts 11 and 19 to rotate. As they begin to rotate the rollers 32 are forced into the deeper portion of the recess against the pressure of the springs 31, so that no parts are moving excepting the driving discs 28 and 33 and the shafts 11 and 19 and their attached parts.

When it is desired to reverse the engine, the dog 22 will engage in the slot 26, and as shown in dotted lines in Fig. 1, force the ball against the shoulder of the driving disc 28 to effect a rearward turning of the shaft 11.

It will be noted that the use of gears is reduced to the pinion 10 and the ring gear 21 so that a large number of gears is eliminated, and a resultant quite silent movement attained. The spring 25 normally retains the ring gear 21 in such a position relatively to the housing 16 as to prevent the entry of the dog 22 into engagement with the driving disc 28 so that idling or free coasting of the device may be effected.

In Fig. 3 I have shown substantially the same arrangement as illustrated in Fig. 1, excepting a slot 23' is provided in the ring gear 21 at the inner edge of this ring gear instead of centrally of the material, as shown in Fig. 1. Projecting through the slot 23' is the fastening screw 24'.

This invention is adapted for mounting on automobiles, motor trucks, tractors, and automotive vehicles generally.

I have shown the arrangement whereby a coasting or idling of the parts may be effected and in which this connection is made from the counter shafts upon which the wheels are mounted. It is believed obvious that if desired, for the purpose of attaining this result, namely, the free coasting with a movement of a minimum number of parts, that the member 28 and its cooperating parts may be mounted at various parts of the vehicle, and particularly on the drive shaft either forwardly or rearwardly of the clutch.

It is the purpose of the present application to embrace the various modifications and changes which may be made in the invention so long as the spirit is present, and the results are attained in substantially the manner set out, and for this purpose I have appended the attached claims.

Having thus described my invention what I claim as new and desire to secure by Letters Patent is:

1. A differential of the class described comprising a drive shaft; counter shafts; a disc mounted on each of said counter shafts, said disc having a plurality of peripheral notches formed therein, deeper at one end than at the other; an embracing member for embracing said discs in close relation to the periphery thereof; a gear ring attached to said embracing member; rollers positioned in said notches; resilient means for forcing said rollers toward the shallow end of said notches and into engagement with the inner surface of said embracing member, the rotation of said embracing member in one direction effecting a clamping of said rollers against said discs and rotating said discs in unison with said embracing member; and means mounted on said ring gear for engaging said discs upon rotation of said ring gear in the opposite direction for rotating said counter shaft in the opposite direction.

2. A differential of the class described comprising: a drive shaft; counter shafts; a disc mounted on each of said counter shafts, each of said discs having a plurality of peripheral notches formed therein, deeper at one end than at the other; an embracing member for embracing said discs in close relation to the periphery thereof; a gear ring attached to said embracing member and extending radially from the periphery thereof; rollers positioned in said notches; resilient means for forcing said rollers toward the shallow end of said notches and into engagement with the inner surface of said embracing member, the rotation of said embracing member in one direction effecting a clamping of said rollers against said discs and rotating said discs in unison with said embracing member; a pinion mounted on said drive shaft for meshing with said gear ring for rotating said embracing member, said embracing member having a notch formed therein; and a dog pivotally mounted on said gear ring for projecting through said notch and engaging one of said discs upon rotation of said gear ring in the opposite direction for rotating one of said counter shafts in the opposite direction.

In testimony whereof I have signed the foregoing specification.

ERNEST C. FOSTER.